United States Patent
McAdoo et al.

(10) Patent No.: US 8,818,547 B2
(45) Date of Patent: *Aug. 26, 2014

(54) APPARATUS FOR PRE-PLATING TRUSS MEMBERS

(75) Inventors: David L. McAdoo, Alvarado, TX (US); Timothy K. McAdoo, Grand Prairie, TX (US)

(73) Assignee: Illinois Tool Works Inc., Glenview, IL (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/500,393

(22) Filed: Jul. 9, 2009

(65) Prior Publication Data
US 2010/0030363 A1 Feb. 4, 2010

Related U.S. Application Data

(60) Provisional application No. 61/085,158, filed on Jul. 31, 2008.

(51) Int. Cl.
*B27F 7/15* (2006.01)
(52) U.S. Cl.
USPC .................................. 700/167; 29/897.31
(58) Field of Classification Search
USPC ........... 700/97, 112, 114, 115, 116, 117, 167, 700/245; 901/50; 29/897.31, 798, 281.5
See application file for complete search history.

(56) References Cited

U.S. PATENT DOCUMENTS

| | | | | |
|---|---|---|---|---|
| 3,908,259 A | * | 9/1975 | Adams | 29/432 |
| 4,691,494 A | | 9/1987 | Gwynne | |
| 6,782,596 B2 | | 8/2004 | Miller | |
| 7,341,246 B2 | * | 3/2008 | Donohue | 269/37 |
| 8,302,292 B2 | * | 11/2012 | McAdoo et al. | 29/783 |
| 2005/0217185 A1 | * | 10/2005 | Moulton et al. | 52/36.4 |
| 2006/0162129 A1 | * | 7/2006 | Strobel et al. | 19/65 R |
| 2008/0172983 A1 | * | 7/2008 | Urmson | 52/745.19 |
| 2008/0300713 A1 | * | 12/2008 | Leith | 700/117 |
| 2008/0313994 A1 | * | 12/2008 | Nuutinen | 52/745.19 |
| 2010/0030369 A1 | * | 2/2010 | McAdoo et al. | 700/213 |

FOREIGN PATENT DOCUMENTS

WO WO 2006111606 A1 * 10/2006
WO WO 2006/136653 A1 12/2006

OTHER PUBLICATIONS

Office Action for Canadian Application No. 2,674,413 dated Jun. 1, 2011.

* cited by examiner

*Primary Examiner* — Ryan Jarrett
(74) *Attorney, Agent, or Firm* — Alston & Bird LLP

(57) ABSTRACT

A pre-plating station may include an automated pre-plating device configured to receive a cut truss member and at least partially fasten a connector plate to a portion of the truss member based on truss design data prior to communication of the truss member to a truss assembly location.

12 Claims, 9 Drawing Sheets

APPARATUS FOR PRE-PLATING TRUSS MEMBERS

CROSS REFERENCE TO RELATED APPLICATION

This application claims the benefit of U.S. Provisional Application No. 61/085,158, filed Jul. 31, 2008, the contents of which are incorporated herein in their entirety.

FIELD OF THE INVENTION

Embodiments of the present invention generally relate to truss fabrication and, more particularly, relate to an apparatus, method and computer program product for enabling pre-plating of truss members.

BACKGROUND OF THE INVENTION

Trusses are common components for many construction framing projects. However, despite the ubiquitous nature of trusses, it is relatively rare that any single truss design is replicated to a large extent. As such, many trusses are custom built for a particular construction project. Due to the highly customized residential and commercial construction markets, a strain is placed on truss manufacturers, which may be particularly acute in the area of set up. For that reason, much of the automation associated with truss fabrication has been focused on automating set up functions for cutting and assembly.

Currently, pieces of lumber are cut to the precise length and properly angled end, sorted and stacked after sawing, and transported to a staging area where truss assembly is performed. When the production schedule requires, the cut and sorted pieces may be moved to the assembly area along with needed connectors, which may include plates with teeth that imbed at least partially into wood members of the truss at their ends or along their length to hold the members together during the assembly process. The pieces may then be laid into an assembly jig, which provides a form or guide for member placement and truss assembly. The connectors may be placed on both top and bottom faces of the lumber at the joints between adjacent pieces.

Due to the custom nature of truss fabrication, it is often necessary to readjust the jig for each different truss. Accordingly, mechanisms have been developed to increase efficiencies related to setting up a jig. For example, jigging tables using lasers to outline jig or lumber patterns or having slidable guide members for more rapid adjustment of the jig have improved the ability of fabricators to customize jigs. However, the placement of lumber in the jig is typically done manually. The installation of connectors is also typically done by hand.

While the top face of the lumber is readily accessible, the bottom face is not since it is typically in contact with a jigging table or other substrate upon which the jig is provided. Accordingly, placement of a top plate, which is a connector engaging a top face of various members forming a joint in the truss, may not be difficult. In fact, various mechanisms including outlining a form of a plate on the various members have been developed to increase efficiency in placement of plates or connectors for the top faces of the lumber in the truss. However, it is typically necessary for the lumber pieces or members forming a particular joint to be simultaneously lifted so that the bottom plate can be slid underneath and properly located. Moreover, the location of the bottom plate is often determined by feel or merely from the positioning of edges that may be visible from above.

U.S. Pat. No. 5,440,977 to Poutanen describes one mechanism aimed at improving truss assembly by affixing connector or nail plates to some truss members prior to transporting the members to an assembly station. However, the assembly of truss members in Poutanen is manual. Although the prior plating of the connector plates may speed the truss assembly process, errors associated with manual handling and placement of truss members may still be introduced.

Given that truss manufacturing is likely to remain a highly customized process and also given that mechanisms for automating truss manufacturing may have the capability of providing time and cost savings that may present market advantages to those employing automation techniques, it may be desirable to introduce a mechanism that may overcome at least some of the disadvantages described above, or further automate the truss assembly process.

BRIEF SUMMARY OF THE INVENTION

Accordingly, embodiments of the present invention may enable pre-plating of truss members. As such, exemplary embodiments may enable increased efficiency in truss assembly by automating pre-plating of truss components. By providing pre-plated truss members, a truss assembly process may be improved by reducing time and labor associated with assembling a truss. For example, by pre-plating truss members, it may no longer be necessary to jig truss members, plate the upward oriented faces of joints and then lift the truss to slide bottom plates under the joints.

In one exemplary embodiment, an automated pre-plating station is provided. The pre-plating station may include an automated pre-plating device configured to receive a cut truss member and at least partially fasten a connector plate to a portion of the truss member based on truss design data prior to communication of the truss member to a truss assembly location.

In another exemplary embodiment, a pre-plating method is provided. The method may include receiving a cut truss member, determining a location of the truss member on which to fasten a connector plate based on truss design data, and employing an automated device to at least partially fastening the connector plate to the determined location prior to communication of the truss member to a truss assembly location.

In yet another exemplary embodiment, a computer program product for pre-plating is provided. The computer program product may include at least one computer-readable storage medium having computer-executable program code portions stored therein. The computer-executable program code portions may include a first program code portion for determining a location of a received cut truss member on which to fasten a connector plate based on truss design data, and a second program code portion for providing instructions to an automated pre-plating device to at least partially fasten the connector plate to the determined location prior to communication of the truss member to a truss assembly location.

Exemplary embodiments of the invention may enable increased automation of a truss assembly process. Accordingly, for example, both the efficiency and quality of truss manufacturing may be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
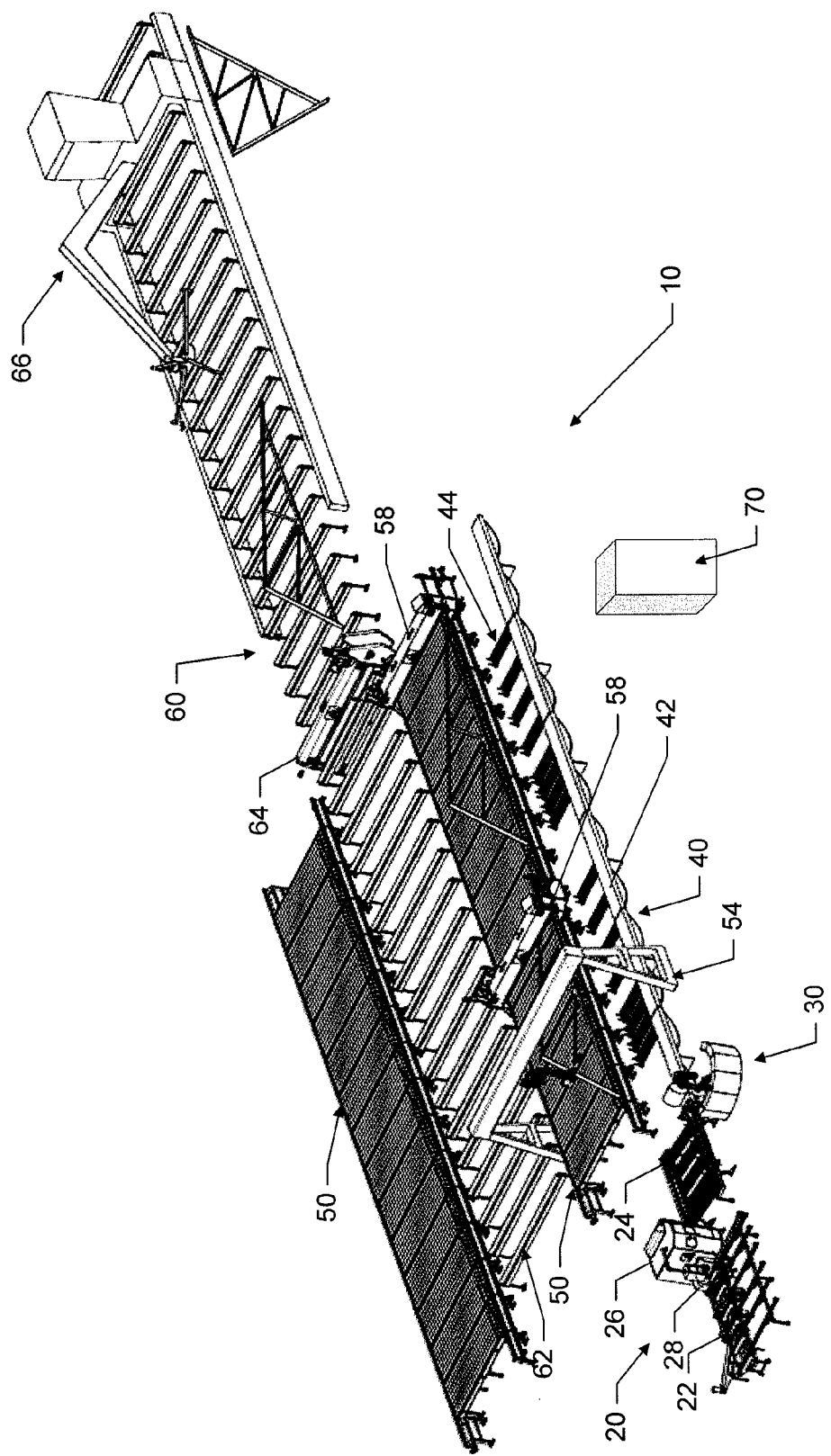
FIG. 1 is a perspective view illustrating a system that may benefit from exemplary embodiments of the present invention.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like reference numerals refer to like elements throughout. Furthermore, as used herein "or" may be interpreted as a logical operator that results in true whenever one or more of its operands are true.

FIG. 1 is a basic block diagram illustrating a system 10 that may benefit from exemplary embodiments of the present invention. As shown and described herein, the system 10 could be employed in the context of a truss manufacturing process. The system 10 may include various stations in which each station performs a particular function with respect to the overall function of the system 10. In particular, each station may represent a functional module which can be implemented in accordance with embodiments of the present invention. As such, embodiments of the present invention need not include, and in many cases may not include, every station. Indeed, embodiments of the present invention may enable the utilization of one or more, or even all of the stations for improving corresponding aspects of a truss manufacturing process, while not necessarily requiring a full implementation of the system shown. Stations not implemented in any particular embodiment may be replaced with conventional mechanisms for performance of corresponding functions or, for example, corresponding functions may be manually accomplished.

As shown in FIG. 1, the system 10 may include a cutting station 20, a pre-plating station 30, a pre-plated member transport station 40, a truss assembly station 50 and a truss transport station 60. Each of the stations will be described below in relation to the functions performed at the corresponding stations and exemplary structures for performing each respective function according to an exemplary embodiment. However, in some instances specific structures alternative to those shown in the drawings and descriptions that follow may also be employed.

The cutting station 20 may include an infeed assembly 22 and an outfeed assembly 24, each of which may be operatively coupled with a cutting device such as a saw. In an exemplary embodiment, the saw may be, for example, a linear saw 26 such as the Alpine Linear Saw (ALS) produced by Alpine Engineered Products. Thus, the linear saw 26 may be configured to receive stock lumber such as a board or piece of lumber transported linearly to the linear saw 26 by the infeed assembly 22 and transported linearly away from the linear saw 26 by the outfeed assembly 24. After cutting by the linear saw 26, a work piece is transported away from the cutting station 20. The work pieces referred to herein may include exemplary truss members or truss components.

In an exemplary embodiment, the infeed assembly 22 may include a conveyor such as rollers, a conveyor belt or other form of conveyance for providing a distal end of an elongated work piece such as an end portion of a piece of lumber into the linear saw 26. Similarly, the outfeed assembly 24 may also include a conveyor such as rollers, a conveyor belt or other form of conveyance for receiving a distal end of the work piece such from the linear saw 26 to transport the work piece from the linear saw 26 in a linear fashion. The rollers may all be powered or non-powered rollers. Alternatively, only certain ones of the rollers may be powered. Furthermore, in some embodiments, the conveyor may include a combination of belts and rollers. According to an exemplary embodiment, the infeed assembly 22, the outfeed assembly 24 and the linear saw 26 may all operate on a single board in sequence to enable the board to pass through the cutting station 20 in a linear or inline fashion.

The linear saw 26 may include an intake motion controller and an outbound motion controller that may take control of a work piece provided from the infeed assembly 22 and provide control to the outfeed assembly 24, respectively, for a work piece cut in the linear saw 26. In this regard, one of the intake motion controller and the outbound motion controller may operate as a master at any given time while the other operates as a slave. Each of the inbound motion controller and/or the outbound motion controller may be equipped to engage and transport a work piece through the linear saw (e.g., via a belt or roller mechanism). In an exemplary embodiment, both inbound motion controller and the outbound motion controller may include a clamping top and bottom roller or belt assembly between which the workpiece is passed and driven through frictional engagement. Dependent upon the work piece being cut, or the stage of the cutting of the work piece, the intake motion controller and the outbound motion controller may alternate master/slave operations to ensure proper cutting of the work piece as the work piece is passed linearly though the linear saw 26. The conveyor of either or both of the infeed assembly 22 and the outfeed assembly 24 may be powered or may be fed manually until the intake motion controller receives an inbound work piece or until the outbound motion controller releases an outbound workpiece.

In an exemplary embodiment, the linear saw 26 may include, for example, prior to the intake motion controller, a marking device 28. The marking device 28 may be configured to print or otherwise place indicia on a work piece to identify the work piece and/or provide markings for use in pre-plating, ordering, or arranging the work piece at a later station. The cutting information is provided to the saw through a CAD-CAM communication of the truss design details to the saw computer. The indicia may be an ink, paint or other visible marking placed on the work piece. Alternatively, the indicia may be a barcode, a radio frequency identification (RFID) tag or other marking that may be read by a vision system or RFID tag reader or other means.

In an exemplary embodiment, the linear saw 26 may be operated by a machine controller (not shown) employing software or otherwise configured to enable pre-programming of cuts to be performed on a particular board. The indicia will typically be used to provide information to operations downstream from the saw. Thus, for example, the linear saw 26 may get all the information it needs to cut and mark truss pieces from the CAD-CAM communication described above. The machine controller may also be in communication with a master control station 70, which may communicate with one or more of the various stations of embodiments of the present invention. The control station 70 may include at least a processor, memory, and a user interface for enabling the user to interface with the control station 70 to direct operations or pre-program operations of one or more of the stations as described in greater detail below. As an alternative, rather than using a central control mechanism such as the control station 70, embodiments of the present invention may be operated by entering job related information into a central database or local database of a respective machine controller of a device of each of the various stations described herein. As such, at each respective machine controller, job related information may be accessed and the corresponding device may operate according to specifications provided in association with the selected job. Each job may correspond to truss design data defining, for example, the length and types of cuts to be applied to each truss member or work piece, the positions and orientations of the plates for each joint, ordering of the truss members for placement in a jig and positions of such members in the jig, etc.

In an exemplary embodiment, the control station 70 may store an application comprising computer readable program code portions (e.g., in the memory) for execution by the processor in which the execution of the application enables the provision of instructions to one or more respective stations for performance of a respective function as described in greater detail below. As such, the control station 70 may be in communication with one or more of the various stations (e.g., the cutting station 20, the pre-plating station 30, the pre-plated member transport station 40, the truss assembly station 50 and the truss transport station 60) or with certain components or devices of the respective stations as described in greater detail below. In connection with an exemplary embodiment, the control station 70 may be in communication with the linear saw 26 and/or the marking device 28 to provide information regarding how to cut and/or mark each work piece. In an exemplary embodiment, the control station 70 may further store (e.g., in the memory) engineering drawings that may describe, for example, specifications for truss assembly (e.g., truss design data). In some cases, various different truss designs may be stored in association with different jobs via a job identifier, or each different truss design may be associated with its own unique job or truss identifier. Thus, for example, the control station 70 may be configured to provide information regarding a particular job or job identifier to one or more stations and a particular device or component of a respective station to which information is provided (e.g., the cutting station 20, the pre-plating station 30, the pre-plated member transport station 40, the truss assembly station 50 and the truss transport station 60) may utilize information regarding the identified job or truss in order to adjust set up parameters, operating parameters or positioning criteria based on the information. Thus, a particular work piece may receive treatment at each station in accordance with a single overall plan, job description or engineering drawing to ensure appropriate operations including cutting, transport, pre-plating, placement, assembly, etc., are performed with respect to each different work piece that may ultimately be used as a truss member for assembly of a truss, or for an entire job or work order comprising multiple trusses.

In this regard, for example, after being cut by the linear saw 26, the work piece may be linearly extracted until the work piece is entirely out of the linear saw 26 and passed along to the outfeed assembly 24. In some instances, the outfeed assembly 24 may pass the work piece on to the pre-plating station 30 still in a linear fashion. As such, for example, the work piece may be extracted from the linear saw 26 and passed along to the pre-plating station 30 by the outfeed assembly 24 while remaining inline. However, in an alternative embodiment as shown in FIG. 1, the outfeed assembly 24 may include a translation mechanism for providing the work piece to the pre-plating station 30 by translating the work piece to a pre-plating intake subassembly 32 of the pre-plating station 30. The translation mechanism may include rollers, belts or other conveying mechanisms. However, in an exemplary embodiment, the translation mechanism may simply include a series of bars or skids extending substantially perpendicular to the elongated length of the work piece as the work piece extends out of the linear saw 26. In some embodiments, additional rollers or skids may extend between (and substantially perpendicular to) at least some adjacent ones of the bars or skids that extend from the outfeed assembly 24 to the pre-plating intake assembly 32.

Figure 2:
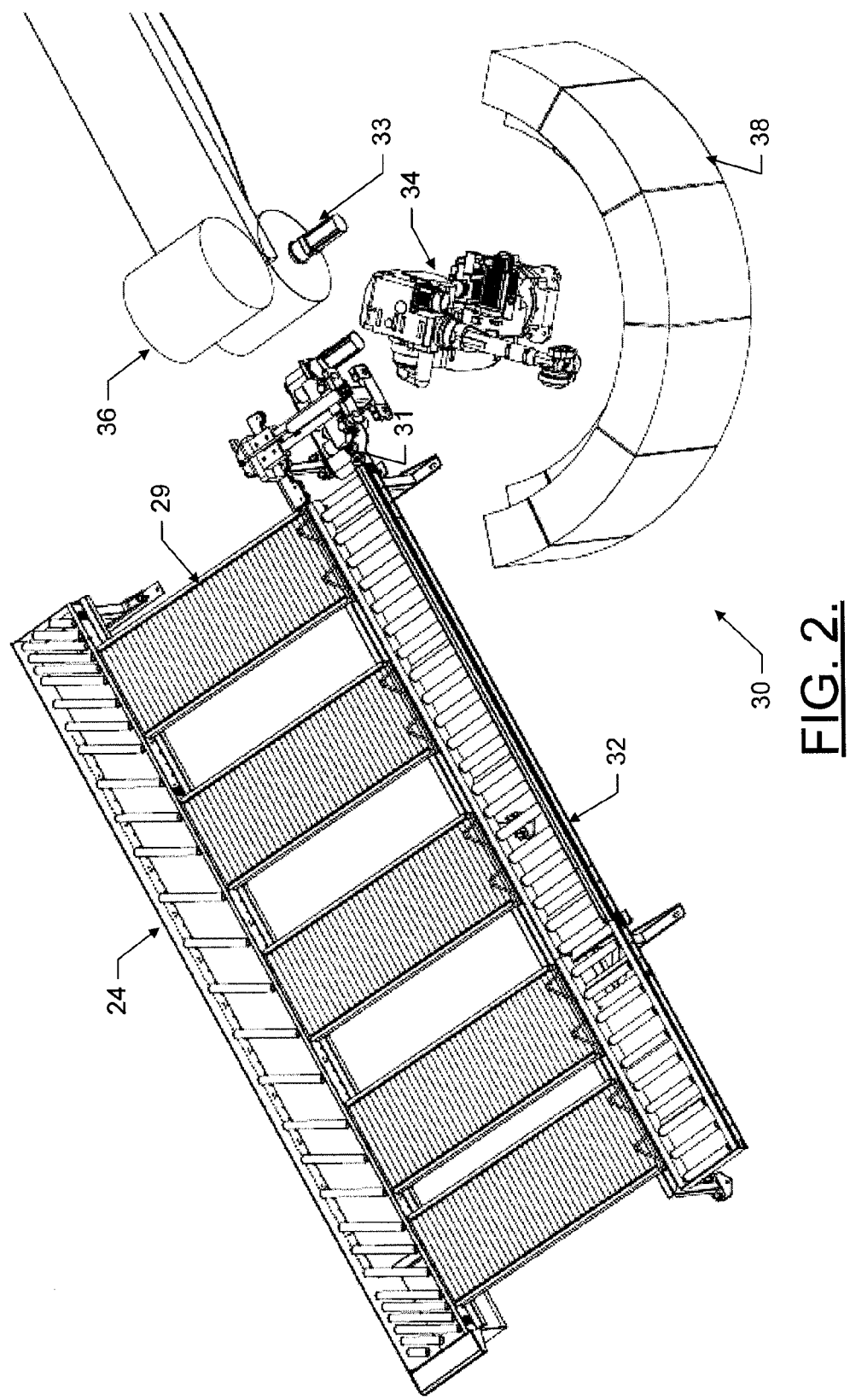
FIG. 2 illustrates an expanded view of a pre-plating station and outfeed assembly according to an exemplary embodiment of the present invention.

FIG. 2 illustrates an expanded view of the pre-plating station 30 and the outfeed assembly 24. In this regard, FIG. 2 shows the outfeed assembly 24 of the cutting station 20 being placed in operable communication with the pre-plating intake assembly 32 via a translation assembly 29 including the bars and skids described above. In an exemplary embodiment, the outfeed assembly 24 may be at a higher elevation than the pre-plating intake assembly 32 so that, in response to work piece being lifted out or pushed laterally with respect to the direction of exit from the linear saw 26, the work piece may slide by gravity fall to the pre-plating intake assembly 32 via the bars or skids of the translation assembly 29. In some exemplary embodiments, the translation assembly 29 may include retractable or removable gates that may stop work pieces from entering the pre-plating intake assembly 32 until such entry is desired. As such, the translation assembly 29 may be able to support a series of work pieces or a queue of lumber that is ordered for inclusion in the assembly of a truss.

In an exemplary embodiment, the pre-plating intake assembly 32 of the pre-plating station 30 may include a conveyor such as a roller, belt or other conveying device for linearly transporting the work piece into the pre-plating device 34, where the work piece may have a connector (e.g., a truss plate) installed by the pre-plating device 34. Connectors or plates as described herein typically have teeth or protrusions extending from one face. The teeth are typically seated within the material of the work piece to hold the plate in place with respect to the board or boards that are joined by the plate. By pre-plating a work piece, a plate is placed on the first piece to a joint at a position where a joint will be formed in order to enable formation of the joint by the addition of additional boards to the joint until the last board is added (having a plate that mirrors the plate on the first board of the joint). The plate on the first piece to the joint will be placed on the side of the piece that is facing down when placed in the assembly jig. The mirror plate on the last piece to the joint will be placed on the side that is facing up.

Figure 3:
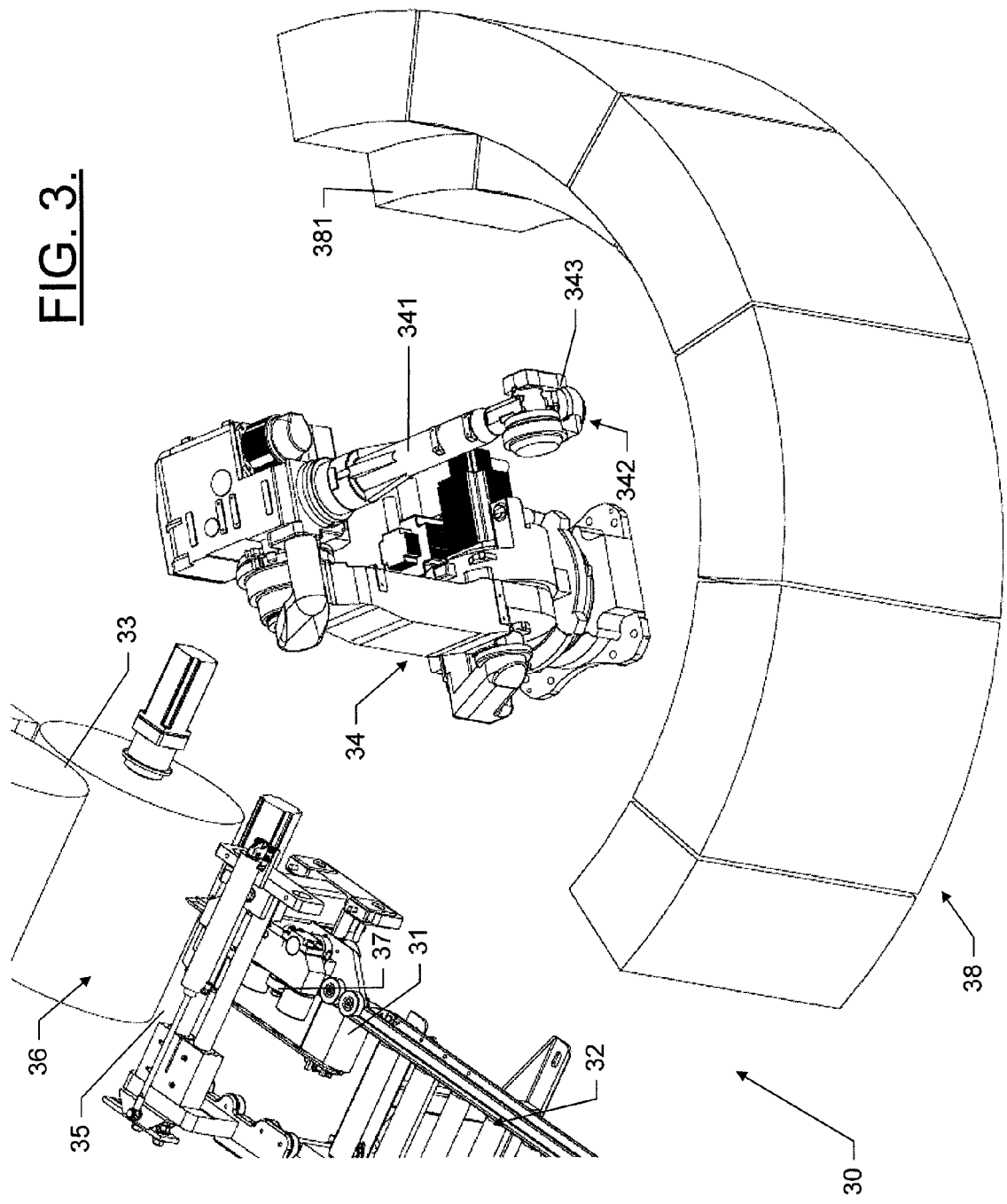
FIG. 3 illustrates an expanded view of the pre-plating station according to an exemplary embodiment of the present invention.

FIG. 3 shows an expanded view of the pre-plating station 30 according to an exemplary embodiment. As shown in FIG. 3, the pre-plating device 34 may, for example, include an intake motion controller 31 and an outbound motion controller 33 similar to those described above in connection with the linear saw 26. In this regard, for example, the intake motion controller 31 may include a top and bottom roller configured to engage the work piece and control movement of the work piece in a linear direction through the pre-plating device 34 until control of the movement is passed to the outbound motion controller 33. Alternatively, a belt mechanism or series of belts or powered rollers may be utilized for the intake motion controller 31.

The outbound motion controller 33 of an exemplary embodiment may include rollers, belts or other conveying mechanisms as well. In one exemplary embodiment, the outbound motion controller 33 may include a roller assembly 36 including both a top roller and a bottom roller. The top roller may be configured to engage a top surface of the work piece while the work piece passes through the roller assembly 36 and the bottom roller may be configured to engage a bottom surface of the work piece as the work piece passes through the roller assembly 36. As such, the spacing between the rollers of the roller assembly 36 may be variable based on the thickness (or narrowest dimension) of the work piece. When spaced in this manner, the rollers may roll a connector plate into the work piece until the teeth of the connector plate are fully embedded and the tooth side surface of the connector plate is in contact with the lumber over the area of engagement. As can be seen in FIG. 5, all pre-plates have some area of engagement with the work piece. The area that does not engage the piece on which the pre-plate is placed will, in part or in whole, engage other work pieces when assembled into the truss. The size of the rollers in the roller assembly 36 may be selected in order to place a suitable amount of force over the surface area of the plate in order to fully (or nearly fully) seat the plate in the work piece. Accordingly, although not required, the rollers (e.g., rollers of the roller assembly 36) of the outbound motion controller 33 may be larger than the rollers of the intake motion controller 31).

A pre-plating space 35 may be defined between the intake motion controller 31 and the outbound motion controller 33 along the plane in which the work piece travels between the intake motion controller 31 and the outbound motion controller 33. In an exemplary embodiment, the pre-plating device 34 may apply a plate to the work piece at a portion of the work piece that lies in the pre-plating space 35. In some embodiments, the intake motion controller 31 may control work piece movement into the pre-plating space 35 and the outbound motion controller 33 may control work piece movement out of the pre-plating space 35. Furthermore, when both the intake motion controller 31 and the outbound motion controller 33 are in contact with the work piece in the pre-plating space 35, one of the intake motion controller 31 and the outbound motion controller 33 may operate as a master, while the other operates as a slave. As such, for example, in some situations, pre-plating of a lead portion (e.g., the portion of a work piece that enters the pre-plating space 35 first as the work piece is linearly passed from the intake motion controller 31 to the outbound motion controller 33) of a work piece may be performed while the work piece is under the control of the intake motion controller 31, while pre-plating of a trailing portion (e.g., the portion of a work piece that exits the pre-plating space 35 last as the work piece is linearly passed from the intake motion controller 31 to the outbound motion controller 33) of a work piece may be performed while the work piece is under the control of the outbound motion controller 33.

According to an exemplary embodiment, the pre-plating device 34 may be a device such as, for example, a robot (e.g., a commercially available robot with a customized attachment for grabbing and seating plates), which is programmed or otherwise configured to pre-plate the cut work pieces provided from the cutting station 20 to the pre-plating station 30. In some instances, the pre-plating device 34 may include or be in communication with an indicia reader 37 (e.g., either an RFID reader or a visual reading system), which may be configured to read the indicia provided by the marking device 28 to enable proper pre-plating of a corresponding work piece. In this regard, for example, the indicia reader 37 may be positioned proximate to a work piece as the work piece passes through the pre-plating station 30 in order to enable the indicia on the work piece to be read by the indicia reader 37. In an exemplary embodiment, the indicia reader 37 may be suspended above the work piece as or shortly after the work piece passes through the intake motion controller 31. However, as an alternative, the indicia reader 37 could be positioned in any location (e.g., below or adjacent to the work piece) that is suitable to enable the indicia to be read prior to the work piece reaching the outbound motion controller 33. Thus, for example, the indicia reader 37 could even read the indicia off the work piece when the indicia is disposed in the pre-plating space 35. Accordingly, in some embodiments, the indicia reader 37 may actually be disposed on the pre-plating device 34 itself (e.g., near or as part of the customized attachment).

In an exemplary embodiment, the pre-plating device 34 may include a rotatable arm 341 and a plating head 342. The rotating arm 341 may be configured to enable 360 degree rotation or merely rotation sufficient to enable the plating head 342 to reach all portions of a plate storage facility 38 and the pre-plating space 35. The plating head 342 may be configured to grab or otherwise acquire (e.g., via magnetic attraction) a plate from the plate storage facility 38 and place the plate at a predetermined position and orientation on the work piece when the work piece is disposed in the pre-plating space 35. As indicated above, the indicia reader 37 could be positioned at the plating head 342. In this regard, the indicia reader 37 could be instead embodied as a vision system 343 disposed at a portion of the plating head 342. However, the vision system 343 could be utilized in addition to the indicia reader 37 for guiding operations (e.g., plate selection and placement) of the plating head 342 or instead of the indicia reader 37.

In an exemplary embodiment, the control station 70 may be in communication with the pre-plating device 34 to provide the pre-plating device 34 with instructions regarding plate selection and/or positioning. The instructions may be generated based on truss design data. Alternatively, instructions regarding plate selection and/or positioning may be made locally at the pre-plating device 34 based on stored information (e.g., associated with a local machine controller of the pre-plating device 34) or based on the indicia. In this regard, in an exemplary embodiment, the indicia provided by the marking device 28 may include information indicating what size or type of plate to obtain from the plate storage facility 38 and may also indicate at what point or at what orientation to place the plate on the work piece. Thus, for example, based on a selected job identifier (e.g., from the control station 70 or the machine controller of the pre-plating device 34), the pre-plating device 34 may be configured to identify a particular work piece (e.g., based on the indicia read thereon) and, for the particular work piece and the selected job identifier, select a corresponding plate and place the selected plate at a position and in an orientation that is appropriate for the particular work piece. As another alternative, the job identifier itself may be indicated in the indicia so that the pre-plating device 34 (or the control station 70) may look up the job identifier associated with the work piece and, for example, information directing how the work piece is to be handled according to the corresponding job identified.

In an exemplary embodiment, the indicia reader 37 may read the indicia on a work piece passing into the pre-plating space 35. Based on the indicia read, the pre-plating device may be programmed or configured to obtain a plate from the plate storage facility 38. As such, the pre-plating device 34 may access and/or extract a particular plate from the plate storage facility in order to enable the pre-plating device 34 to attach the particular plate to a work piece at a predetermined location. The vision system 343 may be utilized to identify and/or select a plate (e.g., based on truss design data) from the plate storage facility 38. The vision system 343 may also be utilized by the pre-plating device 34 to find the correct or predetermined location on the work piece (e.g., as determined by the truss design data and/or the indicia) for plate placement. The plate may then be oriented properly and affixed to the work piece at the correct location.

As an example, a piece of lumber may include indicia placed on the lumber by the marking device 28. The indicia may be read by the indicia reader 37 of the pre-plating device 34. The pre-plating device 34 may extract plating instructions from the control station 70 or from a local database indicating, for the piece of lumber identified in relation to the corresponding job identifier (e.g., either pre-programmed or looked up based on the indicia), which plate should be selected. The pre-plating device 34 may then access the selected plate from the plate storage facility 38 and, either based on the job identifier and the identified piece of lumber or based on information determinable from the indicia (e.g., decoded information or information looked up in a database corresponding to truss design data), determine at what position or in what orientation to place the plate. While the lumber is controlled either by the intake motion controller 31 for plating at or near a leading end of the piece of lumber, by the outbound motion controller 33 for plating at or near a trailing end of the piece of lumber, or by whichever of the intake motion controller 31 and the outbound motion controller 33 is operating as the master motion controller for plating in a middle portion of the piece of lumber (e.g., where both the intake motion controller and the outbound motion controller may engage the piece of lumber during pre-plating), the pre-plating device 34 may affix the plate to the piece of lumber in a position and at an orientation that correlates to the position and orientation indicated in the truss design data.

As an alternative, rather than receiving an identity of the work piece or decoding/looking up information indicating where to plate the work piece, the indicia itself may indicate where and/or how to pre-plate the work piece. In this regard, for example, one or both of the location and orientation of the indicia may determine at what position or in what orientation to place the plate. As such, the indicia may operate as an index mark. In an exemplary embodiment, the plate may be placed in a predefined relationship with respect to the index mark. Thus, for example, the index mark could indicate a mark or line with which an edge of the plate may be aligned. Alternatively, the index mark could be a predefined distance and/or orientation from the edge or another landmark position of the plate (e.g., center, corner, etc.). In some cases the index mark could provide indications regarding at what distance or in what orientation with respect to a landmark position of the plate, the plate should be placed.

Figure 4:
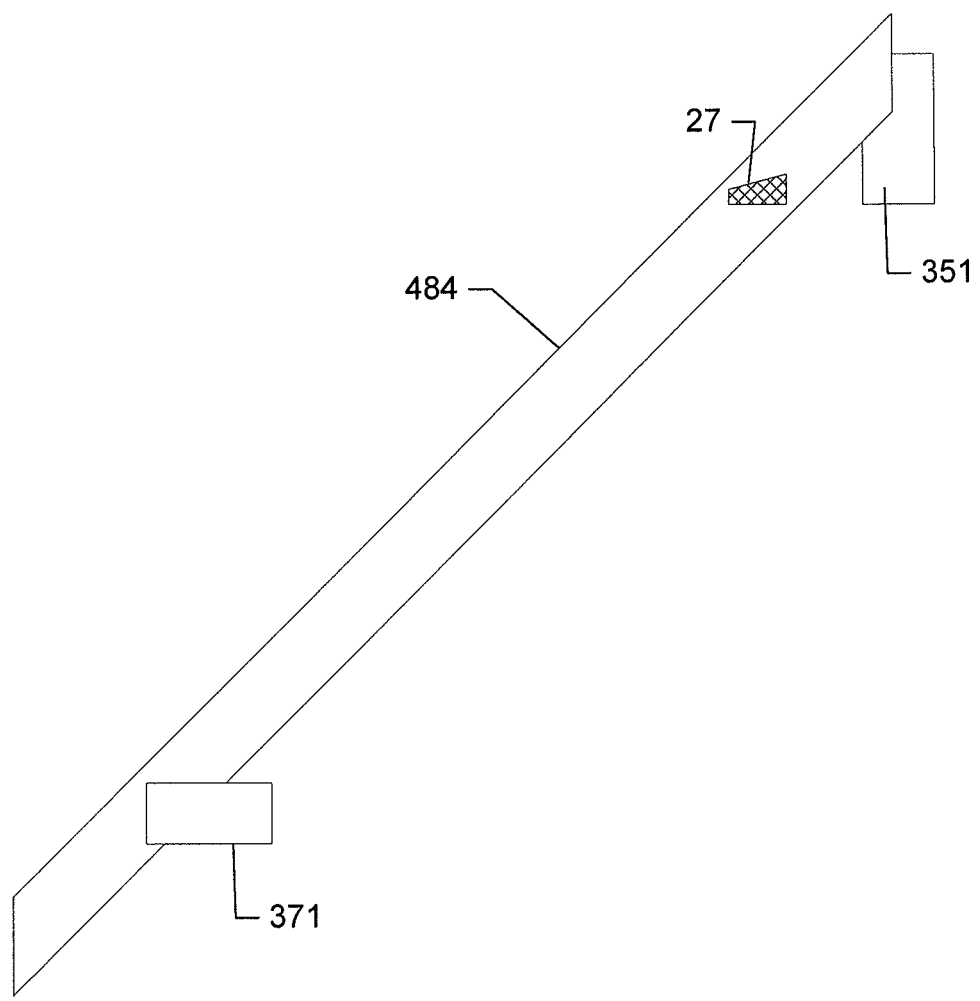
FIG. 4 illustrates a top view of a work piece or truss member having a top plate on a top face of a leading end of the work piece and a bottom plate on a bottom face of a middle portion of the work piece according to an exemplary embodiment of the present invention.

In some embodiments the indicia may indicate on which side of the work piece the plate is to be attached. In this regard, the pre-plating device 34 may be enabled (e.g., by an articulated robot arm) to approach a work piece from either a top looking down or bottom looking up trajectory in order to affix a plate to either side (e.g., either of the broader dimensioned faces) of the work piece. Thus, for example, the pre-plating device 34 may be configured to apply a plate to either side of the work piece (e.g., either the top face or bottom face of a piece of lumber) while the work piece is passed through a gap (e.g., the pre-plating space 35) between the intake motion controller 31 and the outbound motion controller 33. Moreover, embodiments of the present invention may enable the pre-plating device 34 to apply a plate with respect to an index mark that is on the opposite side of the work piece than the side on which the plate is to be applied. In some instances, the pre-plating device 34 may place multiple plates on the same work piece, or no plates at all, dependent upon the position of the work piece in the truss to be assembled. If multiple plates are attached to the same work piece, the plates may even be applied such that at least one plate is affixed to an opposite side of the work piece with respect to a side on which at least one other plate is affixed. Thus, the pre-plating device 34 may, for example, place a plate (e.g., bottom plate 351) on a bottom face of a leading end of a piece of lumber and place a plate (e.g., top plate 371) on a top face of a trailing end or middle portion of the same piece of lumber (e.g., as shown for example in FIG. 4). FIG. 4 also shows, for exemplary purposes, an exemplary indicia 27 on the top face of the work piece (e.g., board 484). In yet another embodiment, the plate placement, order of attachment and side of attachment may all be independent of the indicia.

Figure 5A:
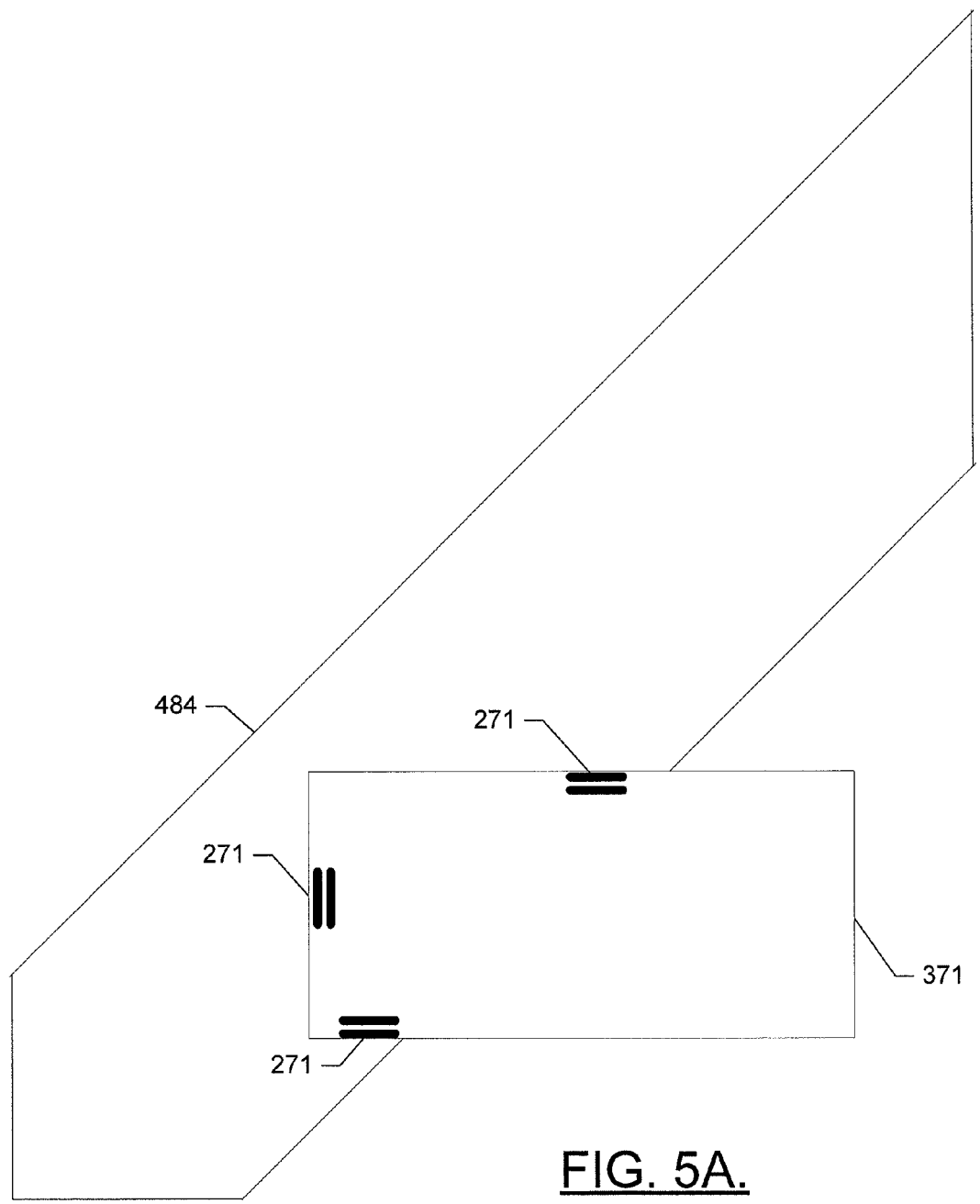
FIG. 5 illustrates several examples of different exemplary embodiments of the present invention with regard to plate placement mechanisms.

FIG. 5 illustrates several examples of different exemplary embodiments of the present invention with regard to plate placement. In this regard, as indicated above, some embodiments may employ indicia 27 that may serve as index markings 271 that may provide an indication of where to place or affix a plate. For example, as shown in FIG. 5A, the index markings 271 may be used to indicate where edges of the plate (e.g., the top plate 371) are to be aligned for proper plate placement. Accordingly, for example, a particular board that is cut in accordance with truss design data may have a predetermined position thereon where a plate is to be placed (also in accordance with the truss design data). The marking device 28 may provide the index markings 271 to indicate the predetermined position to the vision system 343 on the pre-plating device 34. The pre-plating device 34 may then align the corresponding plate based on the index markings 271 and affix the plate to the board accordingly. Rather than merely showing an edge portion where the plate is to be aligned, the index markings 271 could alternatively outline the entirety of the plate's edges for boards to be pre-plated or even for every board associated with a particular joint.

Figure 5B:
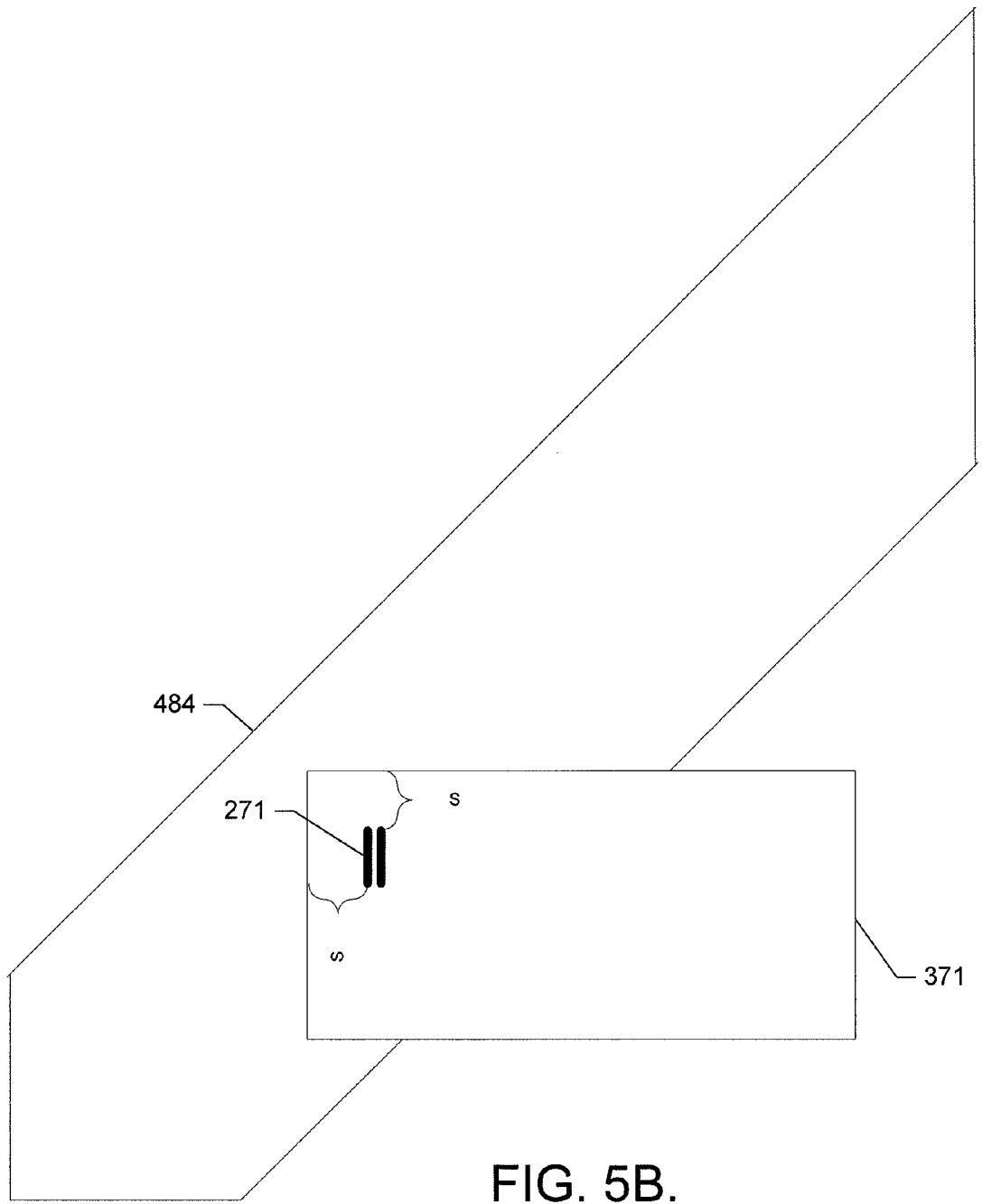

Furthermore, although FIG. 5A shows the index markings 271 being associated with providing an edge alignment marking, the index markings 271 need not be located at the plate edges. In this regard, as shown in the example of FIG. 5B, the index markings 271 may be used to provide information regarding plate placement and orientation without being placed at an edge of the plate outline. For example, the orientation of the index markings 271 may be indicative of the orientation of the plate. Additionally, the index markings 271 may be spaced a predetermined distance (e.g., distance S) from the edge of the plate. In some embodiments, the index markings 271 themselves may indicate the predetermined distance. Thus, for example, the vision system 343 may detect the index markings 271 and place the plate (e.g., the top plate 371) in an orientation and with a spacing relative to the index markings 271 that is determinable from the index markings 271. In some embodiments, an index mark may also simply be a target used to calibrate the movement of the pre-plating device 34. As such, the index mark could simply be an "X", for example, that the vision system 343 may use to compensate for the fact that some pieces may not enter the pre-plating mechanism in an exactly predictable manner. In other words, the precision required for proper location of the plate may be such that minor corrections are required before each plate is attached. The leading end of a subsequent work piece may be detected after it is under the control of the infeed roller, which may provide adequate accuracy in the longitudinal direction. However, it may be desirable to also know its lateral position as well. As such, the lateral position may be determined by, for example, forcing the work piece against a reference surface and letting it slide or roll along that surface, or using the index mark to make small corrections to the path of the robot arm as it approaches the piece to attach the plate.

Figure 5C:
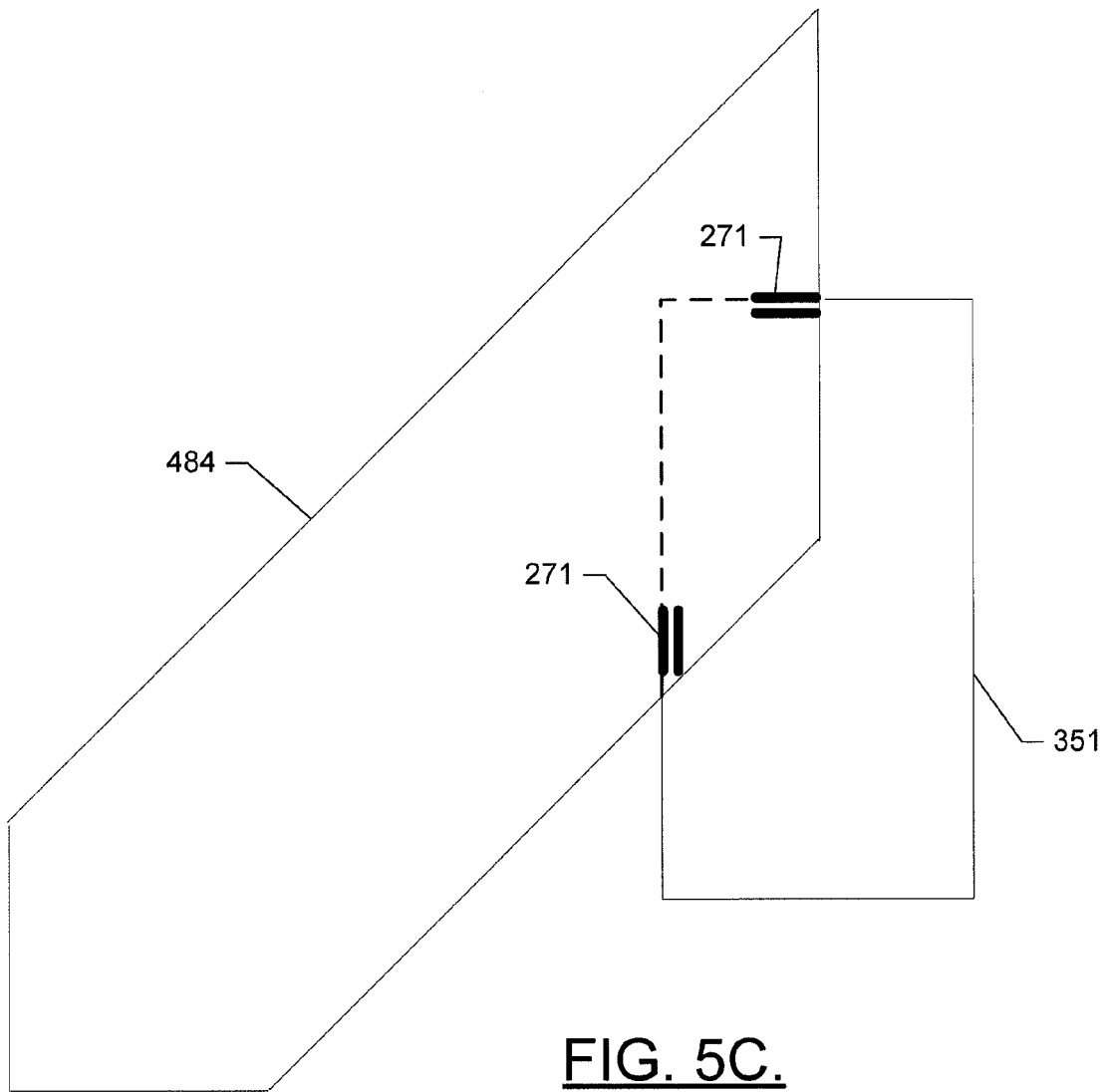

As described above, in some embodiments, the pre-plating device 34 may be configured to place a plate on either side of a work piece. In an exemplary embodiment, the pre-plating device 34 need not necessarily place the plate on the same side of a work piece on which the indicia (or index marking) is disposed. FIG. 5C illustrates an example in which a plate (e.g., the bottom plate 351) is placed on one side of the work piece (e.g., a bottom side of the board 484), while the index markings 271 are placed on the opposite side of the work piece (e.g., a top side of the board 484). The solid lines of the bottom plate 351 indicate visible portions of the top plate 371 while the dashed lines indicate the outline of the portion of the bottom plate 351 that is disposed behind the work piece and is therefore obscured by the work piece given the perspective shown in FIG. 5C. As shown in FIG. 5C, the plate is disposed on the bottom side of the board 484, but is nevertheless aligned relative to or based on the index markings 271 on the top side of the board 484.

In some embodiments the work piece may be momentarily stopped for the application of the plate. However, in other embodiments, it may be desirable to actuate the pre-plating device 34 for plate application with timing and precision enabling pre-plating of a continuously moving work piece. Furthermore, although an exemplary embodiment is described herein in which the work piece (e.g., a piece of lumber having two opposing wider faces that are oriented up and down, respectively) is transported such that the top and bottom faces are the wider faces of the work piece, it may also be possible to practice embodiments of the present invention by transporting the work piece through the pre-plating device 34 on its side. In other words, the work piece may be tilted at any angle up to a ninety degree angle as it passes through the pre-plating device 34. Moreover, each work piece could be tilted to place an appropriate side (e.g., a side intended to receive a plate) toward the pre-plating device 34 to reduce the need for the pre-plating device 34 to approach the work piece at multiple different trajectories.

The plate storage facility 38 may be an array of plates of various different sizes, which may be accessible to the pre-plating device 34. In an exemplary embodiment, the plate storage facility 38 may include a plurality of magazines or bins for holding or dispensing plates of various different sizes. In this regard, for example, the plates may be provided in a magazine in a teeth-to-back arrangement so that each plate may be dispensed or selected in a consistent orientation by the pre-plating device 34. However, if the plates are provided in a teeth-to-teeth arrangement of plate pairs, the pre-plating device 34 may be configured to apply the plates regardless of the orientation of the plate withdrawn from the plate storage facility 38. In an exemplary embodiment in which the pre-plating device 34 is embodied as a robot, the plating head 342 may be embodied as an articulated member with opposingly disposed "fingers" that may be configured to enable reaching at least one finger between a plate in the plate storage facility 38 and an adjacent plate for plate selection. The plating head 342 may then enable placement of the plate at the predetermined portion of the work piece and, after placement, one of the fingers may be extended over a portion of the plate that is engaging the work piece while the other finger is extended over a portion of the work piece that is on a face opposite the face engaging the plate. The plating head 342 may then constrict the fingers toward each other in order to place a force on the plate sufficient to at least partially seat the plate. An amount of pressure applied by the plating head 342 may determine the extent to which the plate is seated in the work piece.

Accordingly, in an exemplary embodiment, the pre-plating device 34 may seat the plate into the work piece partially, while the roller assembly 36 may fully seat the plate. In this regard, for example, the pre-plating device 34 may utilize an electric, pneumatic, hydraulic or other suitably powered compression mechanism for partially seating the plate prior to passage of the plate through the roller assembly 36. As such, for example, the plating head 342 may be configured to apply the plate to a respective portion of the work piece with a fixed or predetermined pressure sufficient to partially seat the plate, while the roller assembly 36 may provide sufficient pressure to fully seat the plate. However, as an alternative, the roller assembly 36 could be omitted if the plating head 342 is provided with a powered compression mechanism of sufficient capability to fully seat the plate. Other alternatives than compression mechanisms are also possible. For example, plates may be fastened into position with a staple or nails that are automatically applied by the pre-plating device 34 while the pre-plating device 34 holds the plate in the proper position. After passing through the outbound motion controller 33 (e.g., the roller assembly), the pre-plated work piece may be provided to the pre-plated member transport station 40.

Figure 6:
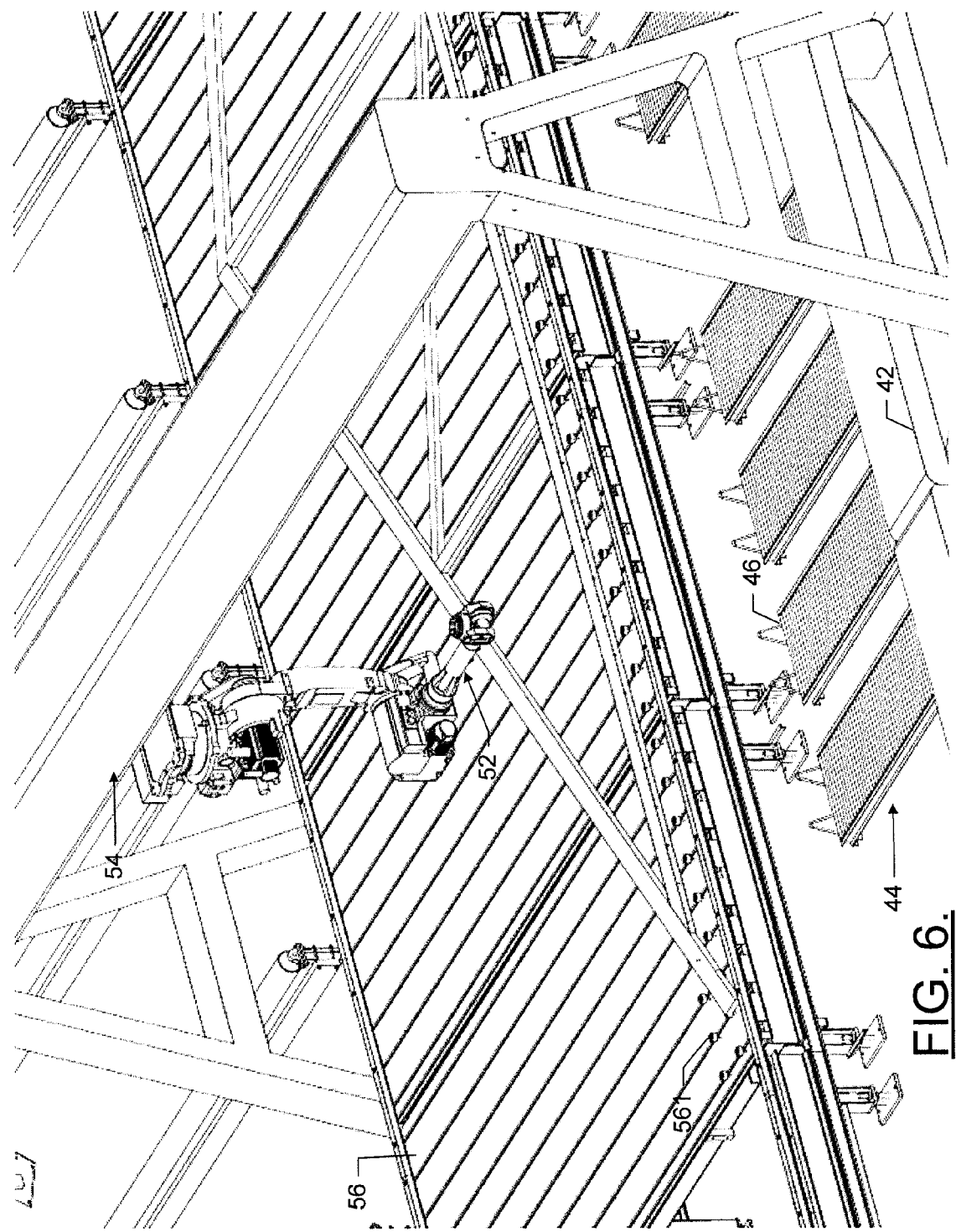
FIG. 6 illustrates an expanded view of portions of a pre-plated member transport station and a truss assembly station according to an exemplary embodiment of the present invention.

The pre-plated member transport station 40 may receive a work piece from the outbound motion controller 33 of the pre-plating station 30 for transport to the truss assembly station 50. In an exemplary embodiment, as shown in FIG. 1, the pre-plated member transport station 40 may include a pre-plated member transporter 42 and a pre-plated member queue 44. FIG. 6 illustrates an expanded view of portions of the pre-plated member transport station 40 and the truss assembly station 50.

Notably, the pre-plated member transport station 40 and other devices referred to hereinafter that include the term "pre-plated" in their names do not necessarily only operate on pre-plated work pieces. To the contrary, as indicated above, since the pre-plating device 34 only plates those work pieces that are to be pre-plated in accordance with the job being performed (e.g., truss design data), some work pieces may pass through the system 10 without being pre-plated. As such, in more general terms, a member may merely be considered a work piece that has passed through the pre-plating device 34 or, more specifically, through the pre-plating station 30 since in some embodiments work pieces that are not to be pre-plated may bypass the pre-plating device 34. Meanwhile, a device having the term "pre-plated" in its name may therefore merely be indicative of the fact that the device can handle members that are pre-plated or members that are not pre-plated.

The pre-plated member transporter 42 may be embodied as a conveying mechanism configured to transport work pieces (e.g., lumber) in a linear fashion (e.g., with an end of one work piece following an end of a preceding work piece such that, while being transported, adjacent work pieces are inline or lie more or less in the same line with each other). As such, the pre-plated member transporter may include a conveyor of any suitable type such as, for example, a conveyor belt or a series or rollers. In some embodiments, since the work pieces transported by the pre-plated member transporter 42 may include plates that are partially seated attached thereto, it may be beneficial to use a conveyor belt or at least closely spaced rollers for the conveying mechanism in order to reduce the likelihood of a plate being caught in the conveying mechanism which may either remove the plate or jam the conveying mechanism.

The pre-plated member transporter 42 may be configured to transport a work piece to a position proximate to the pre-plated member queue 44 in an inline fashion. When the work piece arrives at the pre-plated member queue 44, the work piece may be placed in one of a plurality of queues 46. Each of the queues 46 may be an assembly such as a bed or table apparatus (or a collection of beds or table apparatuses) configured to hold work pieces prior to transportation of such work pieces to the truss assembly station 50. In some embodiments, the queues 46 may be sloped downward from the elevation of the pre-plated member transporter 42 so that when a particular work piece is pushed off of the pre-plated member transporter 42, the particular work piece may fall toward a gate at an end of the queue 46 that is farthest from the pre-plated member transporter 42. If more than one work piece is placed in the queue 46, the work pieces may lie in the queue in the order in which the work pieces were pushed off the pre-plated member transporter 42. In an exemplary embodiment, the pre-plated member transport station 40 may further include one or more queue loaders. From the pre-plated member queue 44, the work piece may be transported to the truss assembly station 50.

The truss assembly station 50 may include a truss assembler 52 (e.g., a truss assembly robot) that may be suspended from a mobile gantry 54 over a jigging table 56. The jigging table 56 may be a substantially flat surface upon which truss assembly may be performed. Thus, the jigging table 56 may be of a size large enough to accommodate trusses of sizes contemplated for assembly. In some embodiments, the jigging table 56 may typically be extended longer in a first direction to support the widest dimension of an assembled truss and shorter in a second direction that is substantially perpendicular to the first direction in order to support the height of the assembled truss. However, in alternative embodiments, the jigging table 56 may be further extended in the first direction in order to enable multiple trusses to be simultaneously assembled on a single jigging table 56.

In an exemplary embodiment, the jigging table 56 may also support a single roller gantry 58 that may be configured to ride over substantially the entire length of the jigging table 56. In this regard, for example, the single roller gantry 58 may be suspended over the jigging table 56 at a height above the table that corresponds substantially to the width of the work pieces used for truss assembly. Thus, when the single roller gantry 58 rolls over the jigging table 56, plates may be partially seated for joints between various assembled work pieces or members. In this regard, each such joint may include at least two members having a plate already fastened in those respective members (e.g., a bottom plate in the first member placed and a top plate seated in the last member placed. However, any additional members other than the first and last members for any particular joint may not have the plate fastened or seated within them until the single roller gantry 58 presses the plate therein. Likewise, the top plate will not have been seated in the first member and the bottom plate will not have been seated in the last member until the single roller gantry 58 presses the plate therein to partially seat the plate. The single roller gantry 58 may be housed in a suspension carriage that may ride, for example, on tracks that extend along an outer perimeter of the jigging table 56 along the first direction. Thus, one single roller gantry 58 may service a plurality of truss assembly stations on a single jigging table 56.

Likewise, the mobile gantry 54 may ride over tracks that include one track that extends along the outer perimeter of the jigging table 56 in the first direction on a side of the jigging table 56 that is opposite of the pre-plated member transporter 42 and another track that extends along the pre-plated member transporter 42 in the first direction on a side of the pre-plated member transporter 42 that is opposite of the jigging table 56. As such, the mobile gantry 54 may extend over both the jigging table 56 and the pre-plated member transporter 42 to enable the truss assembler 52 to service multiple truss assemblies at the truss assembly station 50 on a single jigging table.

In another exemplary embodiment, lumber may be placed on the jigging table at a portion of the jigging table not associated with a particular jig. The location of this jigging table portion could be parallel with the long dimension of the truss and within the longitudinal limits of the truss but no part of it may overlap the truss. For example: the pre-plating station could be in the space between the rail on the edges of the table and the bottom chord of the truss. When this is done, the pre-plates can be partially seated at the same time as the plates in the truss joints. Plates may be manually placed on the lumber based on the indicia on the lumber. The single roller gantry 58 may then be operated to at least partially seat the plates in the lumber to thereby pre-plate the lumber. The pre-plated lumber may then be placed in a jig (e.g., automatically by the truss assembler 52 or manually) to assemble a truss.

The truss assembler 52, which according to an exemplary embodiment, may include a robot suspended from the mobile gantry 54, may be configured to select and grab a particular work piece in order to transport the work piece from the pre-plated member queue 44 to the jigging table 56. The truss assembler 52 may then be configured to place the selected work piece (which may or may not be pre-plated) onto the jigging table 56 in a correct position based on an engineering plan (e.g., a truss design or job). In an exemplary embodiment, the truss assembler 52 may be in communication with the control station 70 to receive information about the engineering plan such as a job identifier or truss design data. However, as an alternative, the job identifier or truss design data may be locally entered into and/or accessed at the truss assembler 52 (e.g., via a machine controller of the robot). The truss assembler 52 may then assemble a truss based on the truss design data using work pieces in the pre-plated member queue 44.

In an exemplary embodiment, the truss assembler 52 may take work pieces from the pre-plated member queue 44 in the order in which the work pieces are provided in the pre-plated member queue 44 and apply the work pieces in their respective positions on the jigging table 56 according to truss design data. In such an embodiment, it may be assumed that the work pieces were cut and pre-plated (or passed through the pre-plating station 30) in an order that enabled the queue loader to push work pieces off the pre-plated member transporter 42 into the pre-plated member queue 44 in the general sequence or order in which the work pieces are to be assembled according to the truss design data provided either locally at various stations or via the control station 70.

In an alternative embodiment, the truss assembler 52 may further include or be in communication with a reader (e.g., a vision system or RFID reader) such that the truss assembler 52 may read (or interrogate) each work piece in the pre-plated member queue 44 in order to find and select the next piece in sequence to be placed on the jigging table 56. If needed, the truss assembler 52 may be configured to search multiple queues 46 for the next piece.

Regardless of how the next piece to be added to the jigging table 56 is determined, once the next piece is found, the next piece may be selected (e.g., via an articulated robot hand) by the truss assembler 52 and transported using a combination of motions of the mobile gantry 54 along its track, the truss assembler 52 along the suspended rail of the mobile gantry 54, and the multiple degrees of freedom of the truss assembler 52 to the jigging table 56. The truss assembler 52 may then orient the selected work piece in accordance with the truss design data to place the work piece in the jig at the correct location. Because at least some of the work pieces may be pre-plated, the order in which the work pieces are placed on the jigging table 56 may be important. Notably, although the order in which the work pieces are placed on the jigging table 56 is important for truss assembly, this does not necessarily mean that only one order is acceptable. To the contrary, numerous different orderings may be suitable for some truss designs. However, in each case, the ordering of work piece placement with respect to the placement of pre-plated members for any joint may be provided to ensure that the first board in any joint includes the bottom plate and the last board in the joint includes the top plate. For example, for any particular joint within a truss, a work piece corresponding to the first piece that will form the joint may include the bottom plate and a work piece corresponding to the last piece that will form the joint may include the top plate. Accordingly, since the first piece for any joint includes the bottom plate, other pieces meeting the first piece at the joint may be placed in their respective positions relative to the first piece without complication. Then, when the last piece is placed relative to the other pieces, the joint may be complete with the addition of the top plate along with the last piece.

The jigging table 56 (shown in greater detail in FIG. 6) may include mobile jig stops 561 that may be configured to be movable to a desirable location along the jigging table 56 to form a jig. As such, in an exemplary embodiment, the jigging table 56 may be comprised of a plurality of spaced apart flat slats that extend in the second direction parallel to each other to span the width of the jigging table 56. The mobile jig stops 561 may be configured to ride in spaces or slots defined between the flat slats to a desired position. In an exemplary embodiment, the jigging table 56 may include a jig stop placement assembly including a plurality of drive motors configured to move the mobile jig stops 561 to a desired location on the jigging table 56. In an exemplary embodiment, the mobile jig stops 561 may be moved automatically to form a jig based on truss design data that may correspond to a particular job or job identifier that may be entered locally or received from the control station 70. The mobile jig stops 561 positioned to form the jig may assist the truss assembler 52 by holding placed pieces relatively steady while each new piece is added to form the truss. The mobile jig stops 561 may also assist the truss assembler 52 by providing position information or landmarks for the truss assembler 52 to use in positioning work pieces in their respective proper locations.

Once a complete truss is assembled, the single roller gantry 58 may be passed over the jigging table 56 to press the assembled truss and partially seat the portion of the plates at each joint which are separate from the pre-plated portions. In an exemplary embodiment, the single roller gantry 58 may make a continuous pass over the length of the jigging table 56 to press multiple assembled trusses. However, in an alternative embodiment, as shown in FIG. 1, multiple single rollers may be provided for use with each area in which a truss may be assembled on the jigging table 56.

In an exemplary embodiment, after an assembled truss has been pressed by the single roller gantry 58, the assembled truss may be passed to the truss transport station 60. In some embodiments, the jigging table 56 may include slots in a direction perpendicular to the long dimension of the jigging table 56 through which one or more vertical liftouts may be extended to lift at least one side of lightweight bars that may extend between the vertical liftouts. The lightweight bars may form a liftout assembly that may initially be positioned at a portion of the jigging table 56 such that the liftout assembly is between the jigging table and the assembled truss when the liftouts extend. Thus, the liftouts may be extendible to lift one side of the liftout assembly higher than the opposite side. Accordingly, sufficient slope may be provided to the liftout assembly to slide the assembled truss off of the liftout assembly and onto the truss transport station 60. The liftouts may be pneumatically, hydraulically, or electrically operated to lift a side of the liftout assembly that is proximate to the pre-plated member transporter 42 and opposite of the truss transport station 60.

As shown in FIG. 1, the truss transport station 60 may serve two separate truss assembly stations (each of which may include a respective cutting station, pre-plating station, and pre-plated member transport station). The truss transport station 60 may include a roller assembly 62, a double roller final press 64 and a knuckleboom truss stacker 66. The roller assembly 62 may include powered and/or non powered rollers provided in an array to form a conveyance mechanism for transporting an assembled truss through the final roller press 64 and on to the knuckleboom truss stacker 66 for stacking and/or shipment. The knuckleboom truss stacker 66 may include an arm configured to enable grasping, lifting, translating and stacking of assembled trusses. As shown in FIG. 1, prior to reaching the knuckleboom truss stacker 66, the assembled truss may be finally pressed to ensure full seating of the plates of each joint of the truss by the double roller final press 64. The double roller final press 64 may include two relatively large rollers moving in opposite directions spaced apart by about the thickness of a work piece in order to fully imbed teeth or engagement members on one face of the plates into the work piece.

Accordingly, embodiments of the present invention may provide a mechanism for cutting, pre-plating, and transporting truss members (e.g., work pieces) to a station at which the members may be assembled automatically and thereafter prepared for shipment to the customer. Thus, a fully implemented system as described above may enable substantially full automation of the truss manufacturing process. Moreover, for each different truss design, automatic setup may be accomplished. In this regard, for example, either from a central location (e.g., the control station 70) or merely by entering data at each individual station, truss design data may be provided to various components at the stations described above to enable automatic setup of the stations or components for the performance of functions according to the truss design data. In an exemplary embodiment, the truss design data could be included in or indicated by indicia that may be provided on each work piece and read therefrom during the assembly process.

Figure 7:
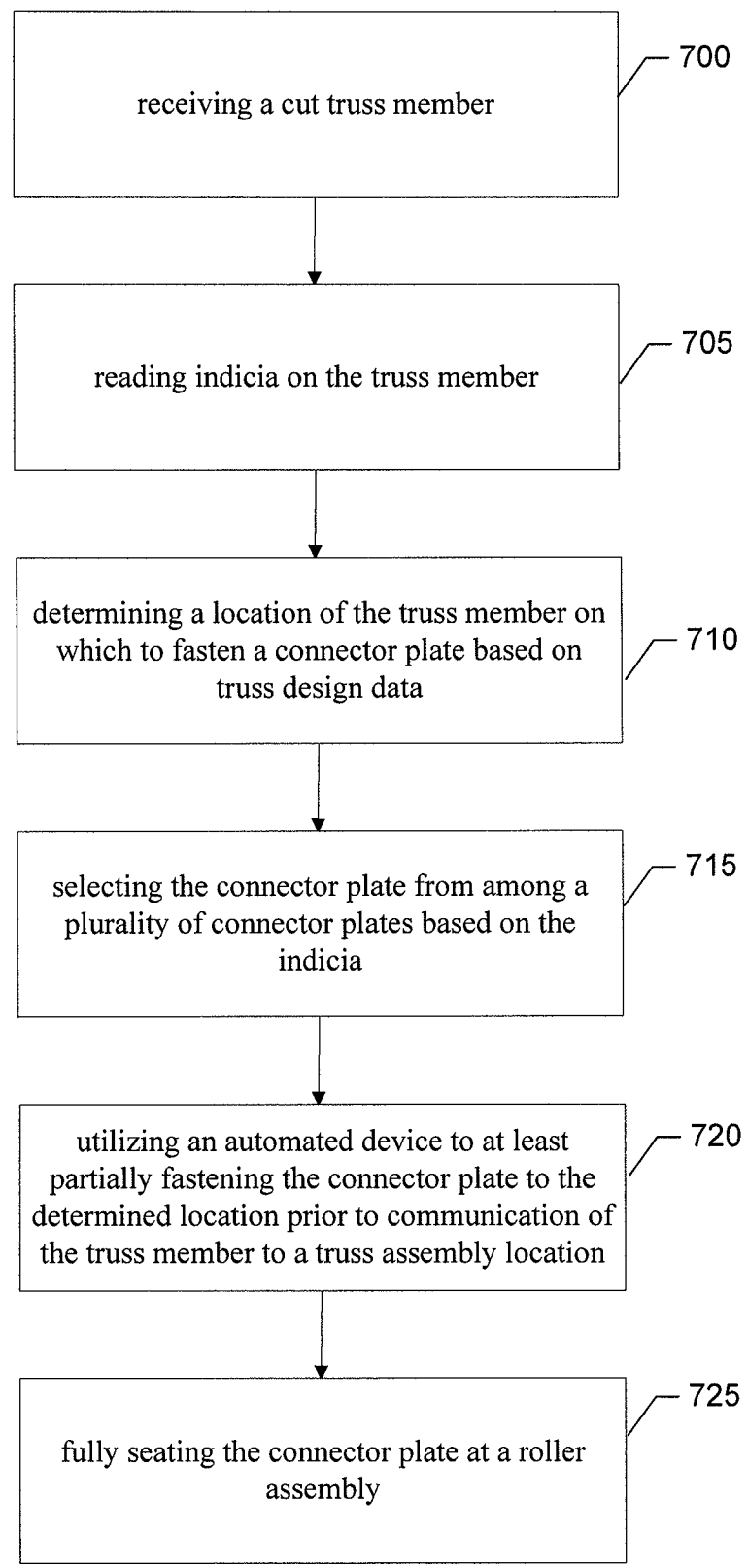
FIG. 7 shows a flowchart of a method of pre-plating truss members according to an exemplary embodiment of the present invention.

FIG. 7 is a flowchart of a method and computer program product according to an exemplary embodiment of the invention. As such, each block or step of the flowchart, and combinations of blocks in the flowchart, can be implemented by various means, such as one or more of hardware, firmware, or software including one or more computer program instructions. In some embodiments, one or more of the procedures described above may be embodied by computer program instructions, which may embody the procedures described above and may be stored by a memory device of, for example, the a machine controller (or the control station 70) and executed thereby. Any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method of pre-plating truss members, as shown in FIG. 7, may include receiving a cut truss member at operation 700 and determining a location of the truss member on which to fasten a connector plate based on truss design data at operation 710. The method may further include at least partially fastening the connector plate to the determined location prior to communication of the truss member to a truss assembly location at operation 720.

In an exemplary embodiment, determining the location may include reading indicia on the truss member and determining the location based on the indicia or reading indicia on a first side of the truss member and determining the location for placement of the connector plate on a second side of the truss member that is opposite of the first side based on the indicia. In an exemplary embodiment, at least partially fastening the connector plate to the determined location may include fastening the connector plate to the truss member when the determined location is disposed in a pre-plating space defined between an intake motion controller and an outbound motion controller of a pre-plating device.

In some cases, the method may further include optional operations such as reading indicia on the truss member at operation 705 and selecting the connector plate from among a plurality of connector plates based on the indicia at operation 715. In an exemplary embodiment, the method may further include fully seating the connector plate at a roller assembly at operation 725.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

That which is claimed:

1. A pre-plating station comprising an automated pre-plating device, the pre-plating station configured to:
   receive a first work piece;
   read indicia on the work piece using a vision system;
   determine a location on the work piece on which to fasten a connector plate based on the indicia;
   select the connector plate from a plurality of connector plates based on the indicia using the pre-plating device; and
   fasten the connector plate to the first work piece, wherein the connector plate comprises a first area that is fastened to the first work piece and a second area that is configured to be fastened to a second work piece in a subsequent operation.

2. The pre-plating station of claim 1, wherein the pre-plating device is configured to fasten the connector plate to the first work piece at a position and orientation indicated by the indicia on the work piece, wherein the indicia is determined based on truss design data.

3. The pre-plating station of claim 1, wherein the pre-plating device comprises a robot configured to perform the fastening of the connector plate.

4. The pre-plating station of claim 3, wherein the robot is configured to apply pressure to at least partially seat the connector plate.

5. The pre-plating station of claim 4, wherein the robot operates under control from a control station that also controls at least one of a truss assembly station, truss transport station or a cutting station.

6. The pre-plating station of claim 1, wherein the pre-plating device is configured to enable fastening of the connector plate to either of opposite sides of the first work piece.

7. The pre-plating station of claim 6, wherein the pre-plating device is configured to fasten the connector plate at a position and orientation determined based on indicia on the first work piece such that the pre-plating device is enabled to fasten the connector plate to an opposite side of the first work piece with respect to a side of the first work piece on which the indicia is disposed.

8. A pre-plating station comprising:
   a vision system configured to read indicia disposed on a first work piece;
   a pre-plating device configured to determine a location on the first work piece on which to fasten a connector plate based on the indicia, wherein the pre-plating device is configured to select an appropriate connector plate from a plurality of connector plates based on the indicia; and
   a plating head configured to fasten a first portion of the connector plate to the first work piece, wherein the first portion of the connector plate is engaged to the first work piece and a second portion of the connector plate is configured to engage a second work piece, and wherein the second portion of the connector is not fastened to the second work piece by the plating head.

9. The pre-plating station of claim 8, further comprising an outbound motion controller configured to advance the first work piece from the pre-plating station, wherein the first work piece advanced from the pre-plating station includes at least one plate fastened thereto and no additional work pieces fastened thereto.

10. The pre-plating station of claim 8, wherein truss design data is indicated by the indicia disposed on the first work piece.

11. The pre-plating station of claim 8, wherein the indicia disposed on the first work piece comprises markings that provide a visual indication of an orientation of the connector plate.

12. The pre-plating station of claim 8, wherein the indicia disposed on the first work piece comprises markings that provide an indication of a correct type of connector plate.

* * * * *